United States Patent

Yamashita

Patent Number: 5,381,406
Date of Patent: Jan. 10, 1995

[54] TIME SWITCHING CIRCUIT
[75] Inventor: Hiroshi Yamashita, Tokyo, Japan
[73] Assignee: NEC Corporation, Tokyo, Japan
[21] Appl. No.: 938,432
[22] Filed: Aug. 31, 1992
[30] Foreign Application Priority Data Aug. 30, 1991 [JP] Japan ................... 3-220289

[51] Int. Cl.6 ........................ H04J 3/02
[52] U.S. Cl. ................ 370/58.2; 370/66
[58] Field of Search ........ 370/53, 58.1, 58.2, 370/58.3, 59, 60, 60.1, 65, 65.5, 66, 67, 68, 63; 340/825.79, 825.8, 825.89

[56] References Cited

U.S. PATENT DOCUMENTS

| | | | |
|---|---|---|---|
| 3,678,205 | 7/1972 | Cohen et al. | 370/66 |
| 3,956,593 | 5/1976 | Collins et al. | 370/66 |
| 4,470,139 | 9/1984 | Munter | 370/66 |
| 4,510,597 | 4/1985 | Lewis | 370/68 |
| 4,941,141 | 7/1990 | Hayano | 370/58.1 |
| 4,972,407 | 11/1990 | Kawai | 370/68 |
| 5,014,268 | 5/1991 | Tyrrell et al. | 370/68 |
| 5,123,012 | 6/1992 | Suzuki et al. | 370/66 |
| 5,197,063 | 3/1993 | Nakano et al. | 370/65.5 |

Primary Examiner—Alpus Hsu
Attorney, Agent, or Firm—Ostrolenk, Faber, Gerb & Soffen

[57] ABSTRACT

A time switching circuit includes n data memories (n being an integer equal to or greater than 2), a respective address control memory for each data memory, and a control section. Each of the n data memories has n input ports corresponding to n data strings and one output port. The n input ports are multi-connected. The respective address control memory of each data memory writes the n data strings in the data memories as written data strings. The control section selectively reads out the written data strings from each of the data memories and outputs the written data strings as readout data strings.

5 Claims, 2 Drawing Sheets

TIME SWITCHING CIRCUIT

BACKGROUND OF THE INVENTION

The present invention relates to a time switching circuit used in a line exchange for exchanging n data strings in a set of data strings and between sets of data strings.

When data exchange, e.g., exchange of n (n is a constant greater than 2) data strings is to be performed in a set of data strings and between sets of data strings, a time switching circuit is used. Time switching circuits of this type are classified into a single time switching circuit in which n data strings are time-divisionally multiplexed, and data are exchanged by one data memory and one address control memory, and a parallel time switching circuit in which data are exchanged using n×n data memories and n address control memories.

When a line capacity is to be increased in a conventional time switching circuit, the speed of data subjected to line exchange must be increased to increase the degree of multiplexing, or the parallel time switching circuit must be used.

However, when the single time switching circuit is used, the operation speed of the switching circuit is disadvantageously increased in proportion to a data speed and the number of line exchange data strings.

On the other hand, when the parallel time switching circuit is used, the total size of data memories is increased in proportion to the square of the number of line exchange data strings. In addition, when a line capacity is to be increased, the total size of the data memories and the like must be increased. In either case, a circuit arrangement itself must be changed, and the line capacity cannot be flexibly increased.

SUMMARY OF THE INVENTION

It is an object of the present invention to provide a time switching circuit which obviates the need for an increase in operation speed.

It is another object of the present invention to provide a time switching circuit in which a memory capacity need not be increased.

It is still another object of the present invention to provide a time switching circuit capable of increasing a line capacity without any change in circuit arrangement.

In order to achieve the above objects, according to the present invention, there is provided a time switching circuit comprising n (n is an integer of not less than 2) data memories each having n input ports corresponding to n data strings and one output port, the n input ports being multi-connected to each other, an address control memory for writing the n data strings in the data memories as written data strings, and a control section for selectively reading out the written data strings from each of the data memories and outputting the written data strings as readout data strings.

DESCRIPTION OF THE PREFERRED EMBODIMENTS

Embodiments of the present invention will be described below.

Figure 1:
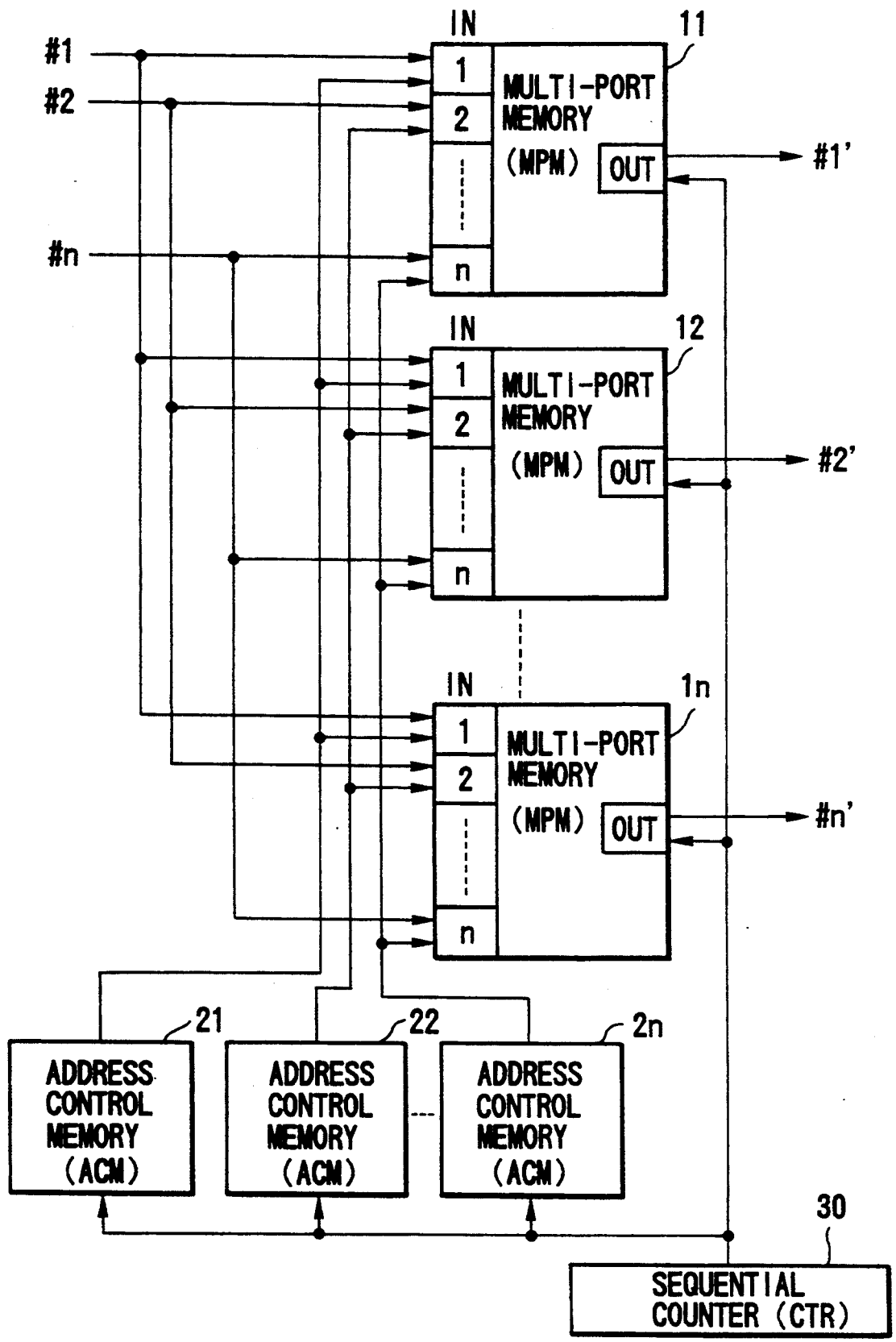
FIG. 1 is a block diagram showing a time switching circuit according to an embodiment of the present invention.

FIG. 1 shows the arrangement of a time switching circuit according to an embodiment of the present invention. In FIG. 1, the time switching circuit shown in FIG. 1 has first to nth data memories 11 to 1n, and each of the data memories (to be referred to as multi-port memories (MPMs) hereinafter) has a plurality of input ports 1 to n. Input lines #1 to #n are connected to input ports 1 to n of each of the multi-port memories 11 to 1n, respectively. That is, the input ports 1 to n of each of the multi-port memories 11 to 1n are multi-connected, and n data strings are input to each of the multi-port memories 11 to 1n.

Address control memories 21 to 2n are connected to the input ports 1 to n of each of the multi-port memories 11 to 1n, the address control memories 21 to 2n are operated under the control of an output sequential counter 30, and data strings are written by the address control memories 21 to 2n in units of input ports 1 to n. According to this embodiment, the address control memories 21 to 2n and the sequential counter 30 are commonly arranged for the multi-port memories 11 to 1n.

When read access, data are simultaneously and sequentially read out from the multi-port memories 11 to 1n under the control of the sequential counter 30, and these data are supplied from the multi-port memories 11 to 1n to output lines #1' to #n', respectively. In this manner, data exchange is performed such that n data strings are exchanged in a set of data strings and between sets of data strings.

Figure 2:
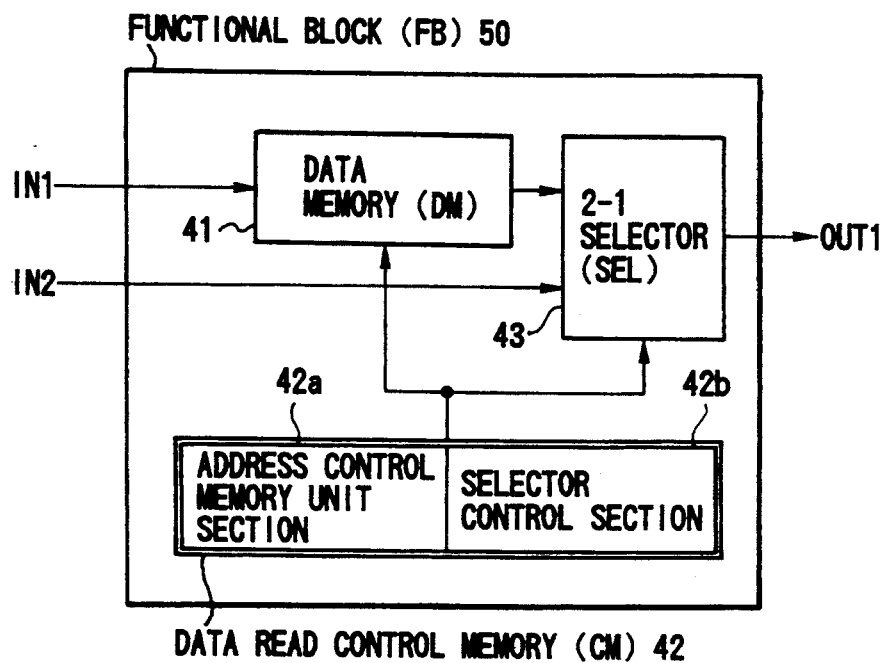
FIG. 2 is a block diagram showing a functional block serving as a unit switching section used in a time switching circuit according to another embodiment of the present invention.

FIG. 2 shows a functional block serving as a unit switching section and used in a time switching circuit according to another embodiment of the present invention. A functional block (FB) 50 includes a data memory (DM) 41, a data read control memory (CM) 42, and a 2-1 selector (SEL) 43. The data read control memory 42 has an address control memory unit section 42a storing predetermined address data for controlling the data memory 41 and a selector control section 42b outputting data bits for controlling the 2-1 selector 43. First data input from the input line IN1 are sequentially written in the data memory 41. The data written in the data memory 41 are read out from the data memory 41 by the address control memory unit section 42a at the data read control memory 42 in a predetermined order and supplied to the 2-1 selector 43 as readout data. On the other hand, second input data are directly supplied from an input line IN2 to the 2-1 selector 43. A selecting operation of the 2-1 selector 43 is controlled in a predetermined sequence by the data read control memory 42. The 2-1 selector 43 selects any one of the readout data from the data memory 41 or the second input data according to the data bits from the selector control section 42b and outputs the selected data from an output line OUT1. This functional block 50 serves as a switching section by itself as described above. As will be described later, when a plurality of functional blocks 50 are combined, the switching capacity can be increased to an arbitrary capacity.

Figure 3:
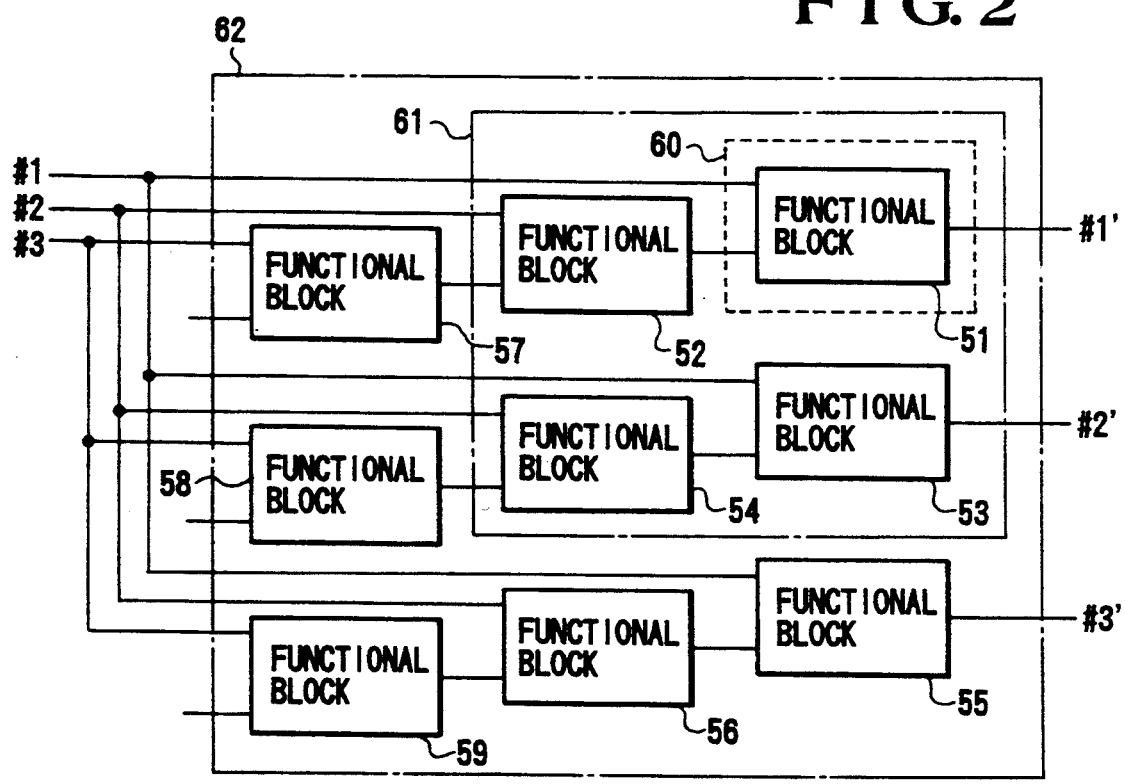
FIG. 3 is a block diagram showing a time switching circuit according to still another embodiment of the present invention.

FIG. 3 shows a switching circuit according to still another embodiment of the present invention when a plurality of functional blocks shown in FIG. 2 are combined. In a time switching circuit 60 having functional blocks 51 each of which is the same as the functional block 50 shown in FIG. 2, in order to double the line capacity, input lines #1 and #2 and output lines #1' and #2' are used, functional blocks 52 to 54 are added, and the blocks 51 to 54 are arranged in a 2×2 matrix. The lines IN2 of the blocks 51 and 53 are connected to the lines OUT1 of the blocks 52 and 54 in the column direction, respectively, and the lines IN1 of the blocks 51 and 52 are connected to the lines IN1 of the blocks 53 and 54 in the row direction, respectively, thereby obtaining a time switching circuit 61. Note that each of the functional blocks 52 to 54 has the same arrangement as that of the functional block 51.

As in the same manner as described above, when input lines #1, #2, and 3# and output lines #1' ,#2', and #3' are used, functional blocks 55 to 59 are added to the time switching circuit 61. The functional blocks 51 to 59 are arranged in a 3×3 matrix such that the input line IN2 of the block 52 (54 or 56) is connected to the output line OUT1 of the block 57 (58 or 59) in each row, the output line OUT1 of the block 52 (54 or 56) is connected to the second output of the block 51 (53 or 55) in each row, and an input IN1 is commonly connected to the blocks 57, 58, and 59 (52, 54, and 56; 51, 53, and 55), thereby obtaining a time switching circuit 62.

In this manner, when the line capacity is to be quadrupled, the functional blocks are arranged in a 4×4 matrix. In general, when the line capacity is to be increased n times the line capacity, functional blocks are arranged in an n×n matrix.

As described above, according to the present invention, since line exchange is performed using a plurality of multi-port memories, unlike a single time switch, an operation speed of the circuit is not proportional to the number of line exchange data strings. In addition, the number of data memories need not be increased in proportion to the square of the number of line exchange data strings, and only the number of input ports is increased. For this reason, a memory amount can be considerably decreased.

In addition, according to the present invention, the basic function of a time switching circuit is given as a functional block, and the functional blocks are arranged in an n×n matrix. Therefore, the line capacity can be easily increased without any change in basic arrangement of the circuit.

What is claimed is:

1. A time switching circuit comprising:
   n, n being an integer of not less than 2, data memories each having n input ports corresponding to n data strings and one output port, said n input ports being multi-connected to each other;
   an address control memory for writing the n data strings in said data memories as written data strings, the address control memory comprising a plurality of distinct address control memories which are respectively arranged for n sets of multi-connected input ports, wherein write access is performed to each of said data memories in units of said multi-connected input ports; and
   a control section for selectively reading out the written data strings from each of said data memories and outputting the written data strings as readout data strings.

2. A circuit according to claim 1, wherein said control section comprises a sequential counter and includes an output from said sequential counter for controlling said address control memory, said sequential counter sequentially performing a read access to said n data memories.

3. A circuit according to claim 2, wherein said sequential counter controls write access operations of said distinct address control memories.

4. A time switching circuit comprising:
   n, n being an integer of not less than 2, data memories each having n input ports corresponding to n data strings and one output port, said n input ports being multi-connected to each other;
   n address control memories, arranged in units of said n input ports, for respectively designating addresses of said n data memories to write the n data strings inputted from the n input ports in said n data memories as written data strings; and
   a control section for selectively reading out the written data strings from each of said n data memories to output the written data strings to the output port of each of said data memories as readout data strings.

5. A time switching circuit comprising:
   a plurality of functional blocks, each functional block having:
      a data memory for sequentially writing first input data;
      an address control memory for randomly reading out written data from said data memory in a predetermined order to form a readout data string;
      a selector for selectively outputting any one of second input data or the readout data from said data memory as selected data;
      selector control means for controlling said selector to obtain the selected data;
      a first terminal for supplying the first input data to said data memory;
      a second terminal for supplying the second input data to said selector;
      an output terminal for outputting the selected data; and
   said plurality of functional blocks being arranged in an n×n matrix, n being an integer of not less than 2, such that said output terminals of first, . . . , (n−1)th functional blocks in each row are connected to said second input terminals of second, . . . , nth functional blocks in each row, and said first input terminals of said functional blocks in each column are commonly multi-connected.

* * * * *